Patented Dec. 15, 1953

2,662,868

UNITED STATES PATENT OFFICE 2,662,868

PREPARATION OF SYNTHETIC RESINS FROM DICYANODIAMIDE

Franz Kaess, Trostberg, and Ernst Doehlemann, Thalham-Altenmarkt, Germany, assignors to Sueddeutsche Kalkstickstoff-Werke A. G., Trostberg, Germany, a firm No Drawing. Application December 16, 1950, Serial No. 201,235

Claims priority, application Germany February 3, 1950

5 Claims. (Cl. 260—45.2)

1

The invention relates to the preparation of synthetic resins from dicyanodiamide.

It is known to heat dicyanodiamide in an open vessel until considerable amounts of ammonia are developed and to react subsequently the obtained decomposition products with formaldehyde. It has also been proposed to heat dicyanodiamide with solid alkalies to form condensation products, whereby losses of ammonia could not be avoided either. Finally, it is also known to prepare condensation products by heating a mixture of dicyanodiamide and phenol, whereby ammonia is split off, and by condensing the reaction product with an aldehyde.

The principal object of the invention is to provide a method of preparing condensation products by heating dicyanodiamide in an open vessel whereby decomposition of the dicyanodiamide and splitting off of ammonia are considerably reduced.

Other objects and advantages will be apparent from a consideration of the specification and claims.

According to the invention, the conventional method of melting dicyanodiamide is modified in such a way that relatively small amounts of substances lowering the melting point of dicyanodiamide are added before the dicyanodiamide is subjected to a heat treatment, and gaseous ammonia is introduced into the mass during heating and that the reaction product is condensed with formaldehyde without previous removal of said melting point depressants.

Suitable admixtures lowering the melting point of dicyanodiamide must be compatible with the other components of the resin and are, for instance: urea, thiourea, cyanamide, dicyanodiamidine and salts thereof, ammonium salts, eutectic mixtures of the compounds listed hereinbefore, also glycol, aniline, toluidine, quinoline, benzylalcohol, and others.

Said substances lower the softening or melting point of the dicyanodiamide to 160–190° C. and bring the reaction in a temperature range where the condensation proceeds gently and does not lead to decomposition. The substances are applied in an amount of about 10, at the most of about 20 per cent by weight of the dicyanodiamide. A current of gaseous ammonia is passed into the reaction zone to assist in preventing decomposition of the dicyanodiamide. This combined action of ammonia and substances lowering the melting point opens up numerous possibilities of preparing products which contain little insoluble substances and which are particularly adapted for the processing with aldehydes or resins.

The heating may be carried out in one or more steps and results in neutral to weakly acid masses. The reaction with aldehydes, particularly formaldehyde, is carried out in a weakly alkaline medium. Alcoholic aldehyde solutions may be used or monohydric or polyhydric alcohols may be added to obtain resinous solutions of lacquer-like nature. In this case we prefer to carry out the reaction in an acid medium.

A modification of our method consists in disintegrating the preheated dicyanodiamide mass and dissolving the same in a solution of an amino-resin, for instance, cyanamide, dicyanodiamide, melamine or urea resin solutions or mixtures thereof may be used. Said amino-resin solutions may also be processed with resin solutions obtained by the action of formaldehyde on the pretreated dicyanodiamide mass to mixed polymerizates.

The following examples are given to illustrate the method of the invention and are not to be considered as limiting the invention. All parts and percentages are given by weight.

Example 1

Dicyanodiamide and 20 per cent of urea, calculated on the dicyanodiamide, were heated to 190° C. and gaseous ammonia was introduced into the mass. The mixture softened at 150° C. The reaction product was condensed with formaldehyde at 75° C. and a pH of 8–9. After incorporating fillers, a molding mass was obtained which was resistant to hot water.

Example 2

Dicyanodiamide was melted with 15 per cent of thiourea under introduction of ammonia at a temperature of 180–185° C. 25 parts of the reaction product were dissolved at a pH of 8.5 and 70° C. in 100 parts of a cyanamide resin solution containing 16% N, which solution had been obtained by reacting cyanamide and formaldehyde.

After incorporating fillers a hot water resistant molding powder was obtained.

Example 3

The 15% of thiourea of Example 2 were replaced by 15 per cent of dicyanodiamidine sulfate. The further treatment was the same as described in Example 2 but instead of the cyanamide resin solution a dicyanodiamide resin solution of 15% N content was used, which solution had been obtained by reacting dicyanodiamide and formaldehyde.

Example 4

The method described in Examples 2 and 3 was carried out with 400 parts of the resin solution and 150 parts of a product obtained from dicyanodiamide by a two-stage heating process at 170° C. and 185° C., respectively, with 15 per cent of an eutectic mixture of ammonium salts. A readily flowing stable mass was obtained without addition of fluxing agents.

Example 5

Dicyanodiamide was heated with 10 per cent of glycol under introduction of ammonia to 175–180° C. 100 parts of the reaction product were condensed with 90 parts of paraformaldehyde, 150 parts of butanol and 5 parts of sulfuric acid. Lacquerlike products were obtained.

What we claim is:

1. A method as defined in claim 5 wherein the heating is carried out in a plurality of temperature stages.

2. A method as defined in claim 5 comprising condensing the heated mixture of dicyanodiamide and the melting point lowering substance with a resin solution containing formaldehyde.

3. A method as defined in claim 5 comprising reacting the heated mixture of dicyanodiamide and the melting point lowering substance with formaldehyde and condensing the obtained solution containing formaldehyde with a resin.

4. A method as defined in claim 5 comprising condensing the heated mixture of dicyanodiamide and the melting point lowering substance with formaldehyde in the presence of an alcohol.

5. A method of preparing synthetic resins comprising mixing dicyanodiamide with a melting point depressant selected from the group consisting of ammonium salts, dicyano diamidine and salts thereof, and glycol, in an amount of about 10 to 20 per cent by weight of the dicyanodiamide, passing ammonia gas into the mixture, heating the mixture at about 170 to 190° C., and reacting the obtained product containing the melting point depressant with formaldehyde.

FRANZ KAESS.
ERNST DOEHLEMANN.

References Cited in the file of this patent

UNITED STATES PATENTS

| Number | Name | Date |
|---|---|---|
| 2,197,357 | Widmer | Apr. 16, 1940 |
| 2,229,291 | Groten | Jan. 21, 1941 |
| 2,262,935 | Hill | Nov. 18, 1941 |
| 2,287,597 | Brookes | June 23, 1942 |

UNITED STATES PATENTS

| Number | Country | Date |
|---|---|---|
| 531,945 | Great Britain | Jan. 14, 1941 |
| 561,186 | Great Britain | May 9, 1944 |